US011044929B2

(12) United States Patent  
Cretors et al.

(10) Patent No.: US 11,044,929 B2  
(45) Date of Patent: Jun. 29, 2021

(54) POPCORN MACHINES HAVING PROCESS CHAMBERS OF INCREASING VOLUME, AND ASSOCIATED SYSTEMS AND METHODS

(71) Applicant: C. Cretors & Company, Wood Dale, IL (US)

(72) Inventors: Charles D. Cretors, Lake Forest, IL (US); Frank Strawn, Deer Creek, IL (US)

(73) Assignee: C. Cretors & Company

( * ) Notice: Subject to any disclaimer, the term of this patent is extended or adjusted under 35 U.S.C. 154(b) by 453 days.

(21) Appl. No.: 15/843,638

(22) Filed: Dec. 15, 2017

(65) Prior Publication Data

US 2018/0168205 A1  Jun. 21, 2018

Related U.S. Application Data

(60) Provisional application No. 62/435,141, filed on Dec. 16, 2016.

(51) Int. Cl.
| A23L 7/161 | (2016.01) |
| A23L 7/187 | (2016.01) |
| A23L 5/10 | (2016.01) |

(52) U.S. Cl.
CPC .............. *A23L 7/161* (2016.08); *A23L 5/17* (2016.08); *A23L 7/187* (2016.08); *A23V 2002/00* (2013.01)

(58) Field of Classification Search
CPC . A23L 7/161; A23L 7/187; A23L 5/17; A23V 2002/00

(Continued)

(56) References Cited

U.S. PATENT DOCUMENTS

| 884,771 A | 4/1908 | Snow |
| 1,251,291 A | 12/1917 | Scheeffer |

(Continued)

FOREIGN PATENT DOCUMENTS

| CN | 2363205 Y | 2/2000 |
| CN | 2865302 Y | 2/2007 |

(Continued)

OTHER PUBLICATIONS

Cretors Coater Mixer Tumbler, http://www.cretors.com/store/catalog.asp?item=39&category_id=3, Copyright 2014, 1 page.

(Continued)

*Primary Examiner* — Thien S Tran
(74) *Attorney, Agent, or Firm* — Perkins Coie LLP (57) ABSTRACT

Popcorn machines having process chambers of increasing volume, and associated systems and methods of operation are disclosed herein. In one embodiment, a popcorn machine includes a tube, a heating element positioned to heat the tube, and an auger positioned at least partially within the tube. The auger can include a central portion extending along a longitudinal axis from a first end to a second end. The central portion decreases in diameter from the first end to the second end, and the central portion and the tube at least partially define an annular popping chamber that increases in volume from the first end toward the second end. A flight extends around the central portion in a helical pattern between the central portion and an inner wall of the tube. In operation, the auger rotates about the longitudinal axis to move ingredients through the heated tube via the flight.

14 Claims, 6 Drawing Sheets

(58) Field of Classification Search
USPC ..... 99/323.6, 323.7, 355; 219/494; 426/233, 426/445, 450
See application file for complete search history.

(56) References Cited

U.S. PATENT DOCUMENTS

| | | | |
|---|---|---|---|
| 1,308,241 A | 7/1919 | Hutchinson | |
| 1,339,662 A | 5/1920 | Morgan | |
| 1,436,400 A | 11/1922 | Mabey | |
| 1,477,704 A | 12/1923 | Holcomb et al. | |
| 1,501,114 A | 7/1924 | Howe | |
| 1,525,966 A | 2/1925 | Vickers | |
| 1,786,877 A | 12/1930 | Thompson | |
| 1,880,822 A | 10/1932 | Cook et al. | |
| 1,961,812 A | 6/1934 | Burch | |
| 1,987,388 A | 1/1935 | Cretors | |
| 2,123,663 A | 7/1938 | Roach | |
| 2,198,152 A | 4/1940 | Cooley et al. | |
| 2,232,954 A | 2/1941 | Manley | |
| 2,248,812 A | 7/1941 | Cretors | |
| 2,467,866 A | 4/1949 | Smolderen et al. | |
| 2,477,416 A | 7/1949 | Page | |
| 2,537,744 A | 1/1951 | Cretors | |
| 2,549,449 A | 4/1951 | Gibson | |
| 2,570,126 A | 10/1951 | Hobbs | |
| 2,575,643 A | 11/1951 | Tamsen | |
| 2,586,347 A | 2/1952 | Kloster | |
| 2,654,823 A | 10/1953 | Altemiller | |
| 2,812,704 A | 11/1957 | Hawks | |
| 2,856,841 A | 10/1958 | Cretors et al. | |
| 2,858,761 A | 11/1958 | Denniss | |
| 2,907,264 A | 10/1959 | Bushway | |
| 2,918,956 A | 12/1959 | Otto | |
| 2,939,379 A | 6/1960 | Schmitt | |
| 2,984,169 A | 5/1961 | Bushway | |
| 3,095,326 A | 6/1963 | Green et al. | |
| D196,811 S | 11/1963 | Lasar | |
| 3,120,168 A | 2/1964 | Lippert | |
| 3,140,952 A | 7/1964 | Cretors | |
| 3,251,579 A | 5/1966 | Lasar | |
| 3,280,720 A | 10/1966 | Kuhn | |
| 3,291,304 A | 12/1966 | Fuchs | |
| 3,421,475 A | 1/1969 | Evans et al. | |
| 3,450,068 A | 6/1969 | Temple | |
| 3,512,989 A | 5/1970 | Smith | |
| 3,554,115 A | 1/1971 | Manley et al. | |
| 3,568,782 A | 3/1971 | Cox | |
| 3,584,585 A | 6/1971 | Hansel et al. | |
| 3,697,289 A | 10/1972 | Day et al. | |
| 3,739,953 A | 6/1973 | Cretors | |
| 3,783,854 A | 1/1974 | Hurko et al. | |
| 3,812,774 A | 5/1974 | Day et al. | |
| 3,930,996 A | 1/1976 | Day et al. | |
| 4,120,236 A | 10/1978 | Blomberg | |
| 4,152,974 A | 5/1979 | Tienor | |
| 4,165,620 A | 8/1979 | Gehauf nee Kiesel et al. | |
| 4,173,925 A | 11/1979 | Leon | |
| 4,178,843 A | 12/1979 | Crabtree et al. | |
| 4,182,229 A | 1/1980 | VandeWalker | |
| 4,206,695 A | 6/1980 | Cretors | |
| 4,288,686 A | 9/1981 | Cretors | |
| 4,289,079 A | 9/1981 | Swistun | |
| 4,329,068 A | 5/1982 | Neuner et al. | |
| 4,331,124 A | 5/1982 | Seidel et al. | |
| 4,337,584 A | 7/1982 | Johnson | |
| 4,417,505 A | 11/1983 | Pietrobelli | |
| 4,438,682 A | 3/1984 | King et al. | |
| 4,444,553 A | 4/1984 | Christodoulou | |
| 4,494,314 A | 1/1985 | Gell, Jr. | |
| 4,512,247 A | 4/1985 | Friedman | |
| D285,404 S | 9/1986 | Wang | |
| 4,648,719 A | 3/1987 | Roben et al. | |
| 4,649,263 A | 3/1987 | Goodlaxson | |
| 4,658,708 A * | 4/1987 | Rastoin | A21C 15/002 118/24 |
| 4,702,158 A | 10/1987 | Ishihara | |
| D294,448 S | 3/1988 | Otto | |
| 4,763,568 A | 8/1988 | Kiczek | |
| 4,828,146 A | 5/1989 | Stein | |
| 4,881,457 A | 11/1989 | Lyga et al. | |
| 5,013,575 A * | 5/1991 | Stadler | A23G 3/04 426/639 |
| 5,033,363 A | 7/1991 | King et al. | |
| 5,035,173 A | 7/1991 | Stein et al. | |
| 5,046,481 A | 9/1991 | Warwick | |
| 5,069,923 A | 12/1991 | Hubbard et al. | |
| 5,083,505 A | 1/1992 | Kohlstrung et al. | |
| 5,154,161 A | 10/1992 | Rogers et al. | |
| 5,176,069 A | 1/1993 | Chen | |
| 5,180,898 A | 1/1993 | Alden et al. | |
| 5,203,256 A | 4/1993 | Mueller | |
| 5,237,912 A | 8/1993 | Fins | |
| 5,263,405 A | 11/1993 | Simon | |
| 5,301,601 A | 4/1994 | Cretors | |
| 5,311,930 A | 5/1994 | Bruenn | |
| 5,315,919 A | 5/1994 | Hoeberigs | |
| 5,332,102 A | 7/1994 | Sennett et al. | |
| 5,339,726 A | 8/1994 | Poulson | |
| 5,397,219 A | 3/1995 | Cretors | |
| 5,417,148 A | 5/1995 | Cavallo | |
| 5,419,239 A | 5/1995 | Covington et al. | |
| 5,445,073 A | 8/1995 | Gilwood | |
| 5,501,139 A | 3/1996 | Lee | |
| 5,513,558 A | 5/1996 | Erickson et al. | |
| 5,539,671 A | 7/1996 | Albrecht et al. | |
| 5,555,792 A | 9/1996 | Stein et al. | |
| 5,579,681 A | 12/1996 | Ubert et al. | |
| 5,590,582 A | 1/1997 | Weiss | |
| 5,605,091 A | 2/1997 | Garber | |
| 5,645,878 A | 7/1997 | Breslin et al. | |
| 5,662,024 A | 9/1997 | Cretors et al. | |
| D384,548 S | 10/1997 | Hsieh | |
| 5,690,018 A | 11/1997 | Hansen | |
| 5,694,830 A | 12/1997 | Hodgson et al. | |
| 5,699,720 A | 12/1997 | Stein et al. | |
| 5,743,172 A | 4/1998 | Weiss et al. | |
| 5,771,779 A | 6/1998 | Stein et al. | |
| 5,782,165 A | 7/1998 | Glenboski et al. | |
| 5,787,798 A | 8/1998 | Stein et al. | |
| 5,857,403 A | 1/1999 | Mann | |
| 5,871,792 A | 2/1999 | Weiss et al. | |
| 5,890,033 A | 3/1999 | Parker | |
| 5,979,301 A | 11/1999 | Perttola | |
| 6,000,318 A | 12/1999 | Weiss et al. | |
| 6,021,707 A | 2/2000 | Bauer et al. | |
| D426,422 S | 6/2000 | Otto | |
| 6,098,526 A | 8/2000 | Stein et al. | |
| 6,123,011 A | 9/2000 | Cretors | |
| 6,164,192 A | 12/2000 | Stein et al. | |
| 6,164,193 A | 12/2000 | Perttola | |
| 6,234,063 B1 | 5/2001 | Evers et al. | |
| 6,234,064 B1 | 5/2001 | Turrel | |
| 6,331,323 B1 | 12/2001 | Adler-Nissen et al. | |
| 6,374,727 B1 | 4/2002 | Cretors | |
| 6,382,087 B1 | 5/2002 | Iiyama | |
| 6,412,395 B1 | 7/2002 | Weiss et al. | |
| 6,412,396 B1 | 7/2002 | Wright | |
| 6,461,033 B2 | 10/2002 | Palmer et al. | |
| 6,534,103 B2 | 3/2003 | Weiss | |
| 6,578,468 B1 | 6/2003 | Horn | |
| 6,612,225 B1 | 9/2003 | Mann | |
| 6,619,280 B1 | 9/2003 | Zhou et al. | |
| 6,669,304 B2 | 12/2003 | Binning | |
| 6,672,201 B2 | 1/2004 | Evans, Sr. et al. | |
| 6,872,923 B2 | 3/2005 | Cretors et al. | |
| 6,914,226 B2 | 7/2005 | Ottaway | |
| 7,082,891 B2 | 8/2006 | Watson | |
| 7,259,357 B2 | 8/2007 | Walker | |
| 7,285,300 B1 | 10/2007 | Allington et al. | |
| 7,721,643 B2 | 5/2010 | Berger et al. | |
| 7,874,244 B1 | 1/2011 | Rhome | |
| 8,011,622 B1 | 9/2011 | Guthrie | |
| 8,201,492 B2 | 6/2012 | Cretors | |
| 8,216,622 B2 | 7/2012 | Evans, Sr. et al. | |

(56) References Cited

U.S. PATENT DOCUMENTS

| | | | |
|---|---|---|---|
| D672,789 S | 12/2012 | Bongiovanni | |
| 8,464,634 B2 | 6/2013 | Cretors et al. | |
| 8,651,014 B2 | 2/2014 | Vidojevic et al. | |
| 8,794,129 B2 | 8/2014 | Cretors | |
| 8,869,679 B2 | 10/2014 | Ryan et al. | |
| 8,887,626 B2 | 11/2014 | Baker, Jr. | |
| 8,899,144 B2 | 12/2014 | Snyder | |
| 9,144,247 B2 | 9/2015 | Cretors | |
| 9,198,532 B2 | 12/2015 | Barrows et al. | |
| 9,408,496 B2 | 8/2016 | Cretors | |
| D802,982 S | 11/2017 | Vidojevic | |
| 10,136,664 B2 | 11/2018 | Ryan et al. | |
| 10,299,499 B2 | 5/2019 | Rhome | |
| 2002/0147006 A1 | 10/2002 | Coon et al. | |
| 2002/0166454 A1 | 11/2002 | Weiss et al. | |
| 2003/0159591 A1 | 8/2003 | Evans et al. | |
| 2003/0168438 A1 | 9/2003 | Zhou | |
| 2004/0045444 A1 | 3/2004 | Mann | |
| 2004/0045542 A1 | 3/2004 | Zhou et al. | |
| 2004/0074397 A1 | 4/2004 | Calhoun | |
| 2004/0265993 A1 | 12/2004 | Darling et al. | |
| 2005/0056154 A1 | 3/2005 | Fu | |
| 2005/0086814 A1 | 4/2005 | Huang | |
| 2006/0149415 A1 | 7/2006 | Richards | |
| 2009/0041915 A1 | 2/2009 | Biechteler | |
| 2009/0056558 A1 | 3/2009 | Cretors et al. | |
| 2009/0126579 A1 | 5/2009 | Cretors et al. | |
| 2009/0145242 A1 | 6/2009 | Pryor, Jr. et al. | |
| 2009/0208621 A1 | 8/2009 | Dotan | |
| 2009/0223378 A1 | 9/2009 | Cretors | |
| 2010/0270282 A1 | 10/2010 | Fernandez et al. | |
| 2011/0014340 A1 | 1/2011 | Spitzley et al. | |
| 2011/0027434 A1 | 2/2011 | Cretors et al. | |
| 2011/0076372 A1 | 3/2011 | Cretors | |
| 2011/0076373 A1* | 3/2011 | Cretors | A23P 30/38 426/450 |
| 2011/0120317 A1 | 5/2011 | Rhome | |
| 2011/0185914 A1 | 8/2011 | Snyder | |
| 2011/0274804 A1 | 11/2011 | Barrows et al. | |
| 2012/0266756 A1 | 10/2012 | Cretors | |
| 2013/0022727 A1 | 1/2013 | Sherwin | |
| 2013/0276640 A1 | 10/2013 | Cretors | |
| 2013/0276641 A1 | 10/2013 | Vidojevic | |
| 2013/0280386 A1 | 10/2013 | Cretors | |
| 2013/0298781 A1 | 11/2013 | Ganuza et al. | |
| 2014/0093636 A1 | 4/2014 | Fitzgerald et al. | |
| 2014/0311356 A1 | 10/2014 | Daniels | |
| 2015/0064320 A1 | 3/2015 | Cretors | |
| 2017/0290360 A1 | 10/2017 | Vidojevic | |
| 2019/0364938 A1 | 12/2019 | Vidojevic | |

FOREIGN PATENT DOCUMENTS

| | | |
|---|---|---|
| CN | 201701013 U | 1/2011 |
| CN | 203424825 U | 2/2014 |
| CN | 203737561 | 7/2014 |
| DE | 8624682 | 12/1986 |
| DE | 20120429 U1 | 7/2002 |
| EP | 0364071 | 4/1990 |
| FR | 2401387 | 3/1979 |
| GB | 0688223 | 3/1953 |
| GB | 717654 | 10/1954 |
| JP | S59135849 | 8/1984 |
| JP | 2006081587 A | 3/2006 |
| WO | WO-9310698 | 6/1993 |
| WO | WO-9706699 A1 | 2/1997 |
| WO | WO-2004054384 A1 | 7/2004 |
| WO | WO-2012145717 A1 | 10/2012 |

OTHER PUBLICATIONS

C. Cretors and Co., "Diplomat" product manual for models DI20C, DI32C, DI20F, DI32F, DI205, TDI205, TDI206, DI325 and TDI326; 1996, 58 pages.

C. Cretors and Co., "Diplomat" product manual for models DI20CP, DI32CP, DI20FP and DI32FP; 1989, 62 pages.

C. Cretors and Co.; Multi-product sell sheet for "The New Diplomat Counter Showcase" and "Thunder Kettle" for models G48E, EPR48E5 and PR48E5; dated 1990, 2 pages.

Gold Medal Products Co., "Funfood Equipment & Supplies" catalog; vol. 56, dated 2000, 108 pages.

LOEB Equipment 20 Gallon Groen Model DNTA20 Twin Scrape Agitated Jacketed Kettle; www.loebequipment.com, Oct. 31, 2011, 1 page.

Proctor Companies; "Concession Stands and Equipment" catalog, vol. 3, 1996, 84 pages.

Proctor Companies; Equipment Catalog, 1992, 33 pages.

Suspended Poppers: 20 oz., 32 oz., 48 oz., 60 oz., C. Cretors and Company, published Nov. 2004, 6 pages.

Topping & Dispensing Systems, C. Cretors and Company Product Brochure, pp. 36-39, published Oct. 2005, 5 pages.

Topping Systems, C. Cretors and Company, published Nov. 2003, 2 pages.

"How to Succeed in the Caramel Corn Business," Gold Medal Products Company, Copyright 2011, gmpopcorn.com, 24 pages.

"Induceramic, infrared honeycomb ceramic burner plate, using Wayback Machine," retrieved from https://web.archive.org/web/20140228035423/http://www.induceramic.com/industrial-ceramics-application/machinery-and-industrial-equipment/coating-equipment/infrared-honeycomb-ceramic-burner-plate, (Year: 2014), 4 pages.

Platvoet et al., "Process Burner 101," American Institute of Chemical Engineers; Retrieved on Aug. 19, 2019 from https://www.aiche.org/sites/default/files/cep/20130835.pdf Copyright 2013 (Year: 2013), 5 pages.

International Search Report and Written Opinion received in International Application No. PCT/US20/23702, dated Jun. 9, 2020, 9 pages.

\* cited by examiner

POPCORN MACHINES HAVING PROCESS CHAMBERS OF INCREASING VOLUME, AND ASSOCIATED SYSTEMS AND METHODS

CROSS-REFERENCE TO RELATED APPLICATION(S)

This application claims priority to U.S. Provisional Patent Application No. 62/435,141, titled "POPCORN MACHINES HAVING PROCESS CHAMBERS OF INCREASING VOLUME, AND ASSOCIATED SYSTEMS AND METHODS," filed Dec. 16, 2016, which is incorporated herein by reference in its entirety.

TECHNICAL FIELD

The following disclosure relates generally to popcorn machines and, more particularly, to popcorn machines having process chambers of increasing volume, and associated systems and methods.

BACKGROUND

Commercial popcorn machines employ a variety of designs to heat and pop popcorn. For example, existing commercial popcorn machines often use large popping kettles, rotatable mesh drums, or various other large containers to contain popcorn during popping cycles. In kettle-based popcorn machines, various flavorings and coatings can be added to the kettle to produce flavored or coated popcorn (e.g., kettle corn). However, in popcorn machines employing rotating mesh drums or other flow-through or continuous popping systems (e.g., auger driven popcorn machines), flavorings or coatings typically must be added after the popping process is completed and the popcorn has been removed from the popping container. In particular, flavorings or sugar coatings added to machines employing mesh drums or existing auger driven systems can result in accumulation of the ingredients within the drum, auger, or associated components that prevents proper operation of the machine. For example, sticky flavorings can accumulate in components of these machines and, absent time consuming and costly cleaning, prevent rotation of the components or significantly reduce heat transfer between heating elements of the machine and the ingredients.

DETAILED DESCRIPTION

The following disclosure describes various embodiments of popcorn machines having process chambers of increasing volume, and associated systems and methods. In some embodiments, a popcorn machine configured in accordance with the present technology includes an auger positioned within a tube that is enclosed in a housing. The housing carries a heating element to heat the tube, and the auger includes a cylindrical central portion extending along a longitudinal axis from a first end to a second end. In several embodiments, a diameter of the central portion decreases from the first end to the second end, and together the tube and the central portion of the auger at least partially form an annular popping chamber that increases in volume from the first end toward the second end. The auger includes a flight that extends around the central portion in a corkscrew pattern. When the auger rotates about the longitudinal axis in operation, the flight moves ingredients (e.g., popcorn) through the heated tube from the first end toward the second end. Although several embodiments can include all of these features, other embodiments may eliminate particular features, components and/or procedures. A person of ordinary skill in the relevant art, therefore, will understand that the present technology, which includes associated devices, systems, and procedures, may include other embodiments with additional elements or steps, and/or may include other embodiments without several of the features or steps shown and described below with reference to FIGS. 1-7.

As discussed above, many existing popcorn machines do not provide for the efficient production of coated or flavored popcorn. The present technology includes several embodiments of popcorn machines and associated systems and methods that have process chambers of increasing volume that can pop popcorn and coat popcorn. Certain details are set forth in the following description and FIGS. 1-7 to provide a thorough understanding of various embodiments of the disclosure. To avoid unnecessarily obscuring the description of the various embodiments of the disclosure, other details describing well-known structures and systems often associated with popcorn machines, augers, popping chambers, heating devices, and the components or devices associated with the manufacture of conventional popcorn machines or augers are not set forth below. Moreover, many of the details and features shown in the Figures are merely illustrative of particular embodiments of the disclosure. Accordingly, other embodiments can have other details and features without departing from the spirit and scope of the present disclosure. In addition, the various elements and features illustrated in the Figures may not be drawn to scale. Furthermore, various embodiments of the disclosure can include structures other than those illustrated in the Figures and are expressly not limited to the structures shown in the Figures.

Figure 1:
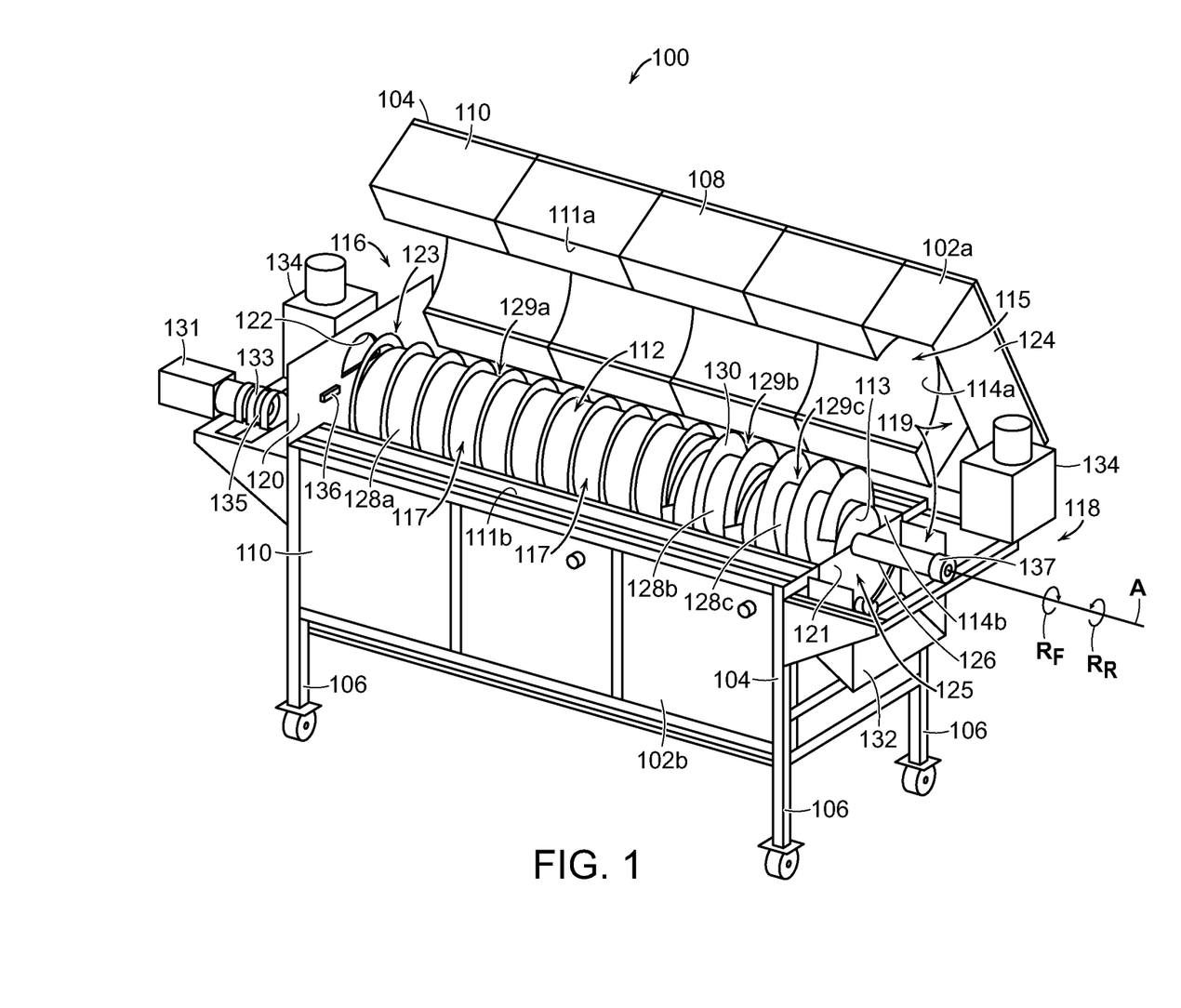
FIG. 1 is an isometric view of a popcorn machine configured in accordance with an embodiment of the present technology.

FIG. 1 is an isometric view of a popcorn machine 100 configured in accordance with an embodiment of the present technology. In the illustrated embodiment, the popcorn machine 100 includes a housing 102 having an upper portion 102a that is hingeably connected to a lower portion 102b. The housing 102 includes a frame 104 supported by legs 106, and a plurality of walls or panels 110 attached to the frame 104 and forming an enclosure or shell 108. The panels 110 can be removably attached to the frame 104 to provide access for, e.g., cleaning, repair, and/or maintenance. The upper portion 102a is rotatable from an open position in which a first sealing surface 111a is spaced apart from a second sealing surface 111b (as shown in FIG. 1), to a closed position in which the sealing surfaces 111 contact each other.

An auger 112 can extend from a first end 116 of the popcorn machine 100 toward a second end 118 along a longitudinal axis A. The auger 112 includes a shaft 126 that is rotatably supported on opposite ends by one or more bearing assemblies 137 (only one bearing assembly 137 is visible in FIG. 1). The auger 112 can also include a central portion 113 formed from a plurality of cylindrical sections 128 of varying diameter. In the illustrated embodiment, for example, the central portion 113 includes three cylindrical sections 128, (identified individually as a first cylindrical section 128a, a second cylindrical section 128b, and a third cylindrical section 128c). As shown in FIG. 1, the cylindrical sections 128 have progressively smaller diameters. More specifically, the first cylindrical section 128a has a larger diameter than the second cylindrical section 128b, which has a larger diameter than the third cylindrical section 128c. Accordingly, the auger 112 tapers or steps down from a larger diameter at a first end 123 of the central portion 113, to a smaller diameter at a second end 125.

The auger 112 can also include one or more flights 130 that extend around the cylindrical sections 128 in a corkscrew (e.g., helical) pattern from the first end 123 of the central portion 113 to the second end 125. In the illustrated embodiment, the auger 112 includes one continuous flight 130 that extends around and along the auger 112. In other embodiments, augers can include two or more flights that extend along the associated auger. A motor 131 (e.g., an electrically driven servo motor) can be connected to the auger shaft 126 via a pulley 133 and a belt 135.

The upper housing portion 102a includes an upper tube portion 114a, and the lower housing portion 102b includes a lower tube portion 114b. Together, the upper tube portion 114a and the lower tube portion 114b form a circumferential boundary of an annular popping chamber or process chamber 115 that encloses the auger 112. In particular, when the upper portion 102a is in a closed position, the sealing surfaces 111a and 111b are brought together and the two tube portions 114a and 114b form a tube 114 that extends around the auger 112, at least partially forming the process chamber 115 that extends between a first end wall 120 and a second end wall 121. As used herein, the term "process chamber" can refer to a chamber in which popcorn popping operations, cooking operations, and/or coating operations are performed. For example, as described in more detail below, the popcorn machine 100 can pop popcorn and coat popcorn with sugar, salt, or other flavorings, all within the process chamber 115.

The process chamber 115 can include one or more zones corresponding to an axial location on the auger 112. For example, in the illustrated embodiment the process chamber 115 includes a first annular zone 129a adjacent to the first cylindrical section 128a, a second annular zone 129b adjacent to the second cylindrical section 128b, and a third annular zone 129c adjacent to the third cylindrical section 128c. The zones 129 are defined by the space between the outer wall of the corresponding cylindrical section 128 and the inner wall of the tube 114, and each successive zone 129 includes an annular volume of greater depth than a preceding zone (i.e., an inside diameter of the annular volume decreases while an outside diameter remains constant). Accordingly, the popping chamber or process chamber 115 increases in volume as the auger 112 tapers between the first end 123 of the central portion 113 and the second end 125.

With the upper housing portion 102a in a closed position, the flight 130 is positioned adjacent to the tube 114, thereby forming a channel 117 within the popping chamber 115. More specifically, the channel 117 is a volume that extends around the auger 112 in a helical or spiral path, and is at least partially bounded by adjacent portions of the flight 130, by the outer walls of the cylindrical sections 128, and/or by the inner walls of the tube 114. Rotation of the auger 112 can move popcorn and/or other ingredients along the channel 117 and through the process chamber 115. That is, the motor 131 can rotate the auger 112 to drive unpopped corn kernels, popcorn, cooking oil, sugar, salt, flavorings, and/or other ingredients placed in the tube 114 from the first end 116 of the popcorn machine 100 toward the second end 118, as discussed in more detail below.

The first end wall 120 encloses the popping chamber 115 at the first end 116, and the second end wall 121 partially encloses the popping chamber 115 at the second end 118. More particularly, the second end wall 121 encloses a lower half of the popping chamber 115 at the second end 118, and the upper half of the popping chamber 115 is open to an exit chamber 119 at the second end 118. As described in more detail below, popcorn and/or other ingredients that are processed in the process chamber 115 can be moved through the channel 117 and the process chamber 115, and discharged over the second end wall 121 into the exit chamber 119.

The upper housing portion 102a includes an exit chamber end wall 124 that at least partially encloses an upper portion of the exit chamber 119. An outlet chute 132 can be positioned at a lower end of the exit chamber 119 to deliver products (e.g., popcorn, kettle corn, etc.) from the exit chamber 119 to a receptacle or a subsequent processing machine (e.g., a sifter cooler). The first end wall 120 and the exit chamber end wall 124 include process exhaust openings 122 (only one visible in FIG. 1) positioned to provide an exit path for steam, gases, particulates and/or other by-products produced within the process chamber 115 during popping and/or coating operations (i.e., process emissions). Exhaust plenums 134 can be positioned adjacent the exhaust openings 122 to facilitate the removal of by-products that are produced in the process chamber 115. For example, a ducting system can be connected to the exhaust plenums 134 to draw fumes from the process chamber 115 through the exhaust openings 122. In several embodiments, the exhaust plenums 134 can include electrically powered fans that draw by-products from the process chamber 115 through the exhaust openings 122. One or more thermocouples 136 can be positioned within the process chamber 135 to monitor a temperature therein.

Figure 2A:
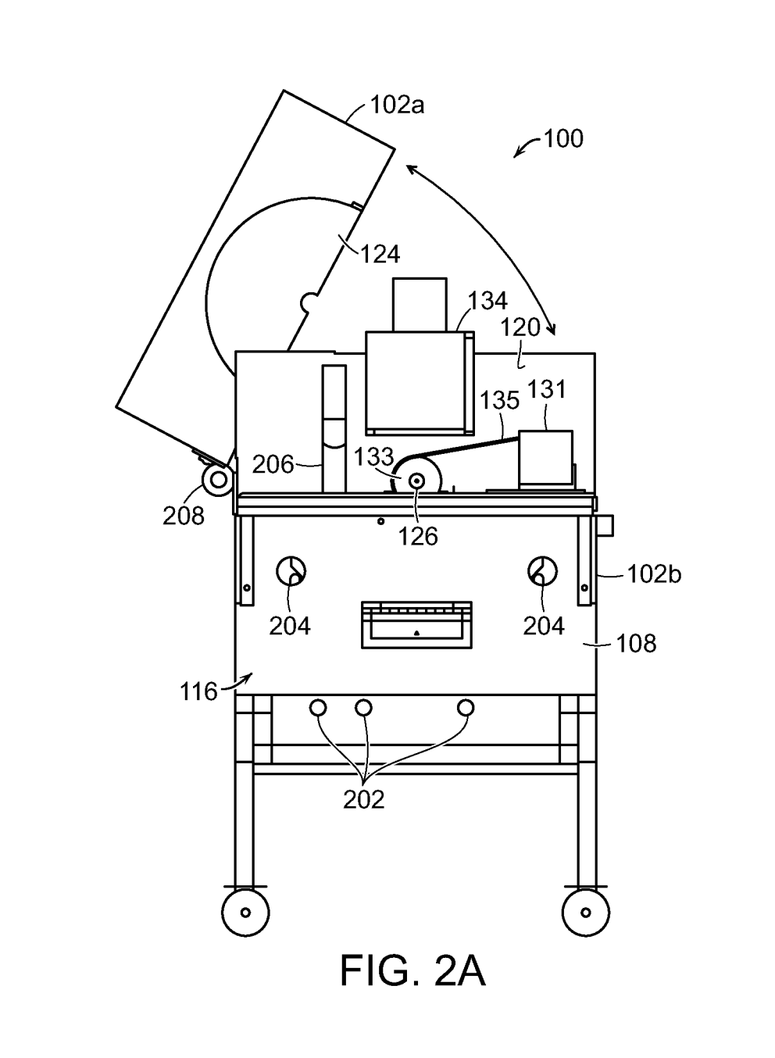
FIGS. 2A and 2B are opposite end views of the popcorn machine of FIG. 1.
Figure 2B:
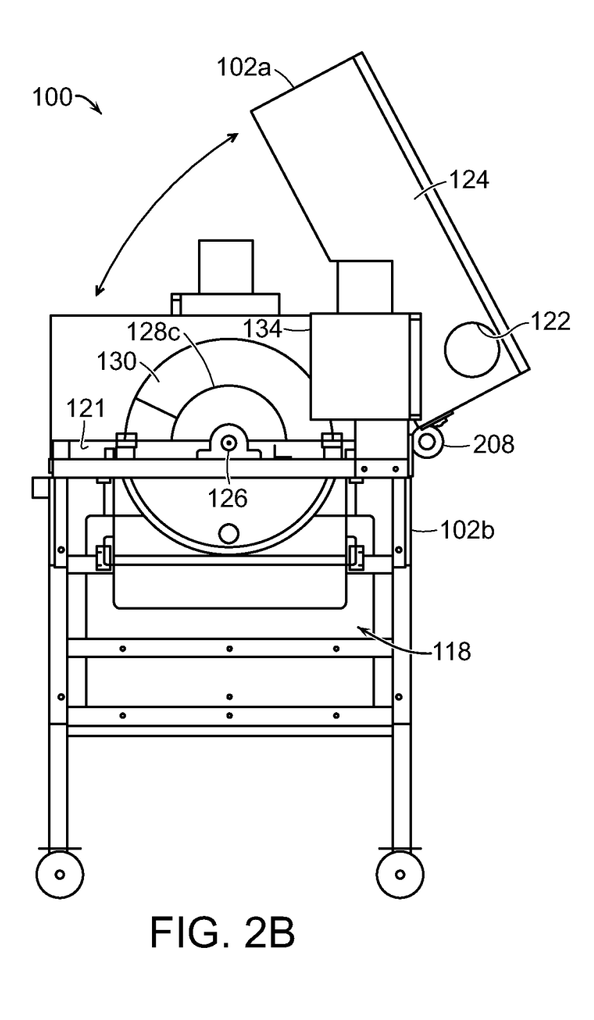

FIGS. 2A and 2B are end views of the first end 116 and the second end 118, respectively, of the popcorn machine 100 configured in accordance with an embodiment of the present technology. As shown in FIG. 2A, the first end 116 can support a plurality of gas inlets 202 for corresponding conduits that can extend through the shell 108 and into an interior of the popcorn machine 100. The first end 116 can also support a plurality of (e.g., two) combustion exhaust outlets 204 for corresponding exhaust ducts that extend through the shell 108 and into the interior of the popcorn machine 100. As discussed in more detail below, gas (e.g., natural gas, propane, etc.) can be delivered to one or more burners positioned within the popcorn machine 100 via the inlets 202, and combustion by-products from the burners can be exhausted through the outlets 204. One or more feed tubes 206 can extend through an opening in the first end wall 120 to deliver ingredients (e.g., popcorn kernels, sugar, etc.) to the process chamber 115.

Referring to FIGS. 2A and 2B together, the upper housing portion 102a can be rotatably mounted to the lower housing portion 102b via one or more hinges 208. Rotation of the upper housing portion 102a from the open position shown in FIGS. 2A and 2B to a closed position can align the process exhaust opening 122 shown at the second end portion 128 in FIG. 2B with a corresponding inlet (not shown) for the blower 134.

Figure 3:
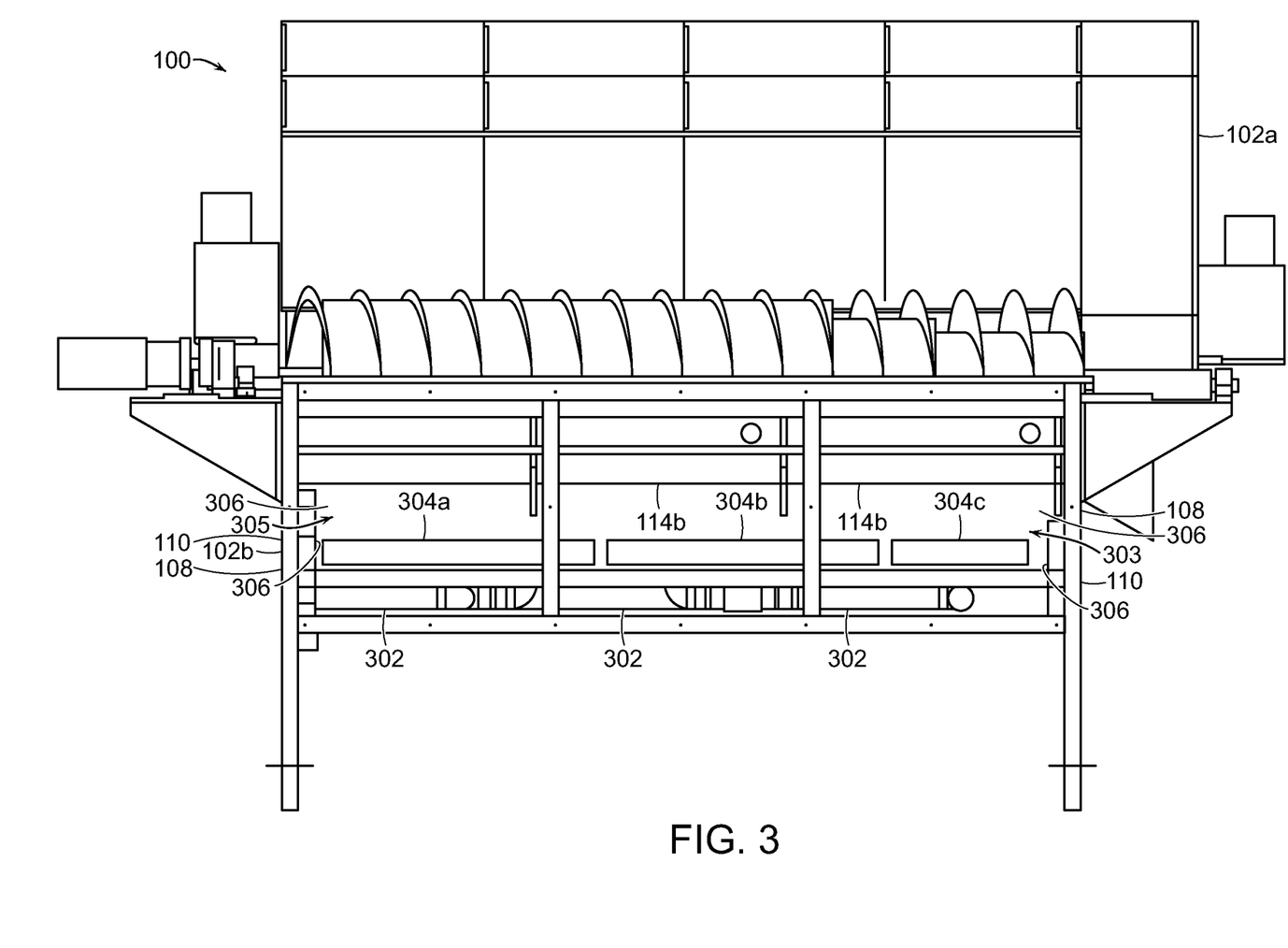
FIG. 3 is a side view of the popcorn machine of FIG. 1.

FIG. 3 is a side view of the popcorn machine 100 configured in accordance with an embodiment of the present technology. In the illustrated embodiment, several components have been omitted to better illustrate internal components of the popcorn machine 100. For example, several of the panels 110 on the lower housing portion 102b have been removed to expose one or more gas conduits 302 that extend through an interior portion 303 of the lower housing portion 102b from the gas inlets 202 (FIG. 2A) to one or more heating elements or burners 304. In the illustrated embodiment, the gas conduits 302 direct gas to three burners 304 (identified individually as a first burner 304a, a second burner 304b, and a third burner 304c). In some embodiments, the burners 304 can be conventional gas burners that include a perforated metal ring or plate for combustion of the gas. In the illustrated embodiment, the burners 304 are gas-fired radiant burners having ceramic heating elements. In several embodiments, the burners 304 can be at least generally similar in structure and/or function to those described in U.S. Patent Application No. 62/319,088, filed Apr. 6, 2016, and entitled POPCORN MACHINES HAVING GAS-FIRED RADIANT BURNERS AND ASSOCIATED SYSTEMS AND METHODS, which is incorporated herein by reference in its entirety.

The interior portion 303 can include a combustion chamber 305 that is at least partially enclosed by the lower tube portion 114b and a plurality of heat shields 306. The heat shields 306 can be positioned within the interior portion 303, parallel to and spaced apart from the panels 110 forming the shell 108. To expose internal components of the popcorn machine 100, one of the heat shields 306 that extends along a right side of the lower housing portion 102b is not shown in FIG. 3. The heat shields 306 can help to reduce heat loss from the combustion chamber 305, and thereby reduce the temperature of the shell 108 and increase the temperature of the tube 114 and the process chamber 115 (FIG. 1) during operation of the popcorn machine 100. Although the illustrated embodiment of FIG. 3 includes gas burners 304, other embodiments can include alternative heating elements. For example, one or more electric heating elements can be positioned within the interior portion 303 to heat the tube 114 in operation.

Figure 4A:
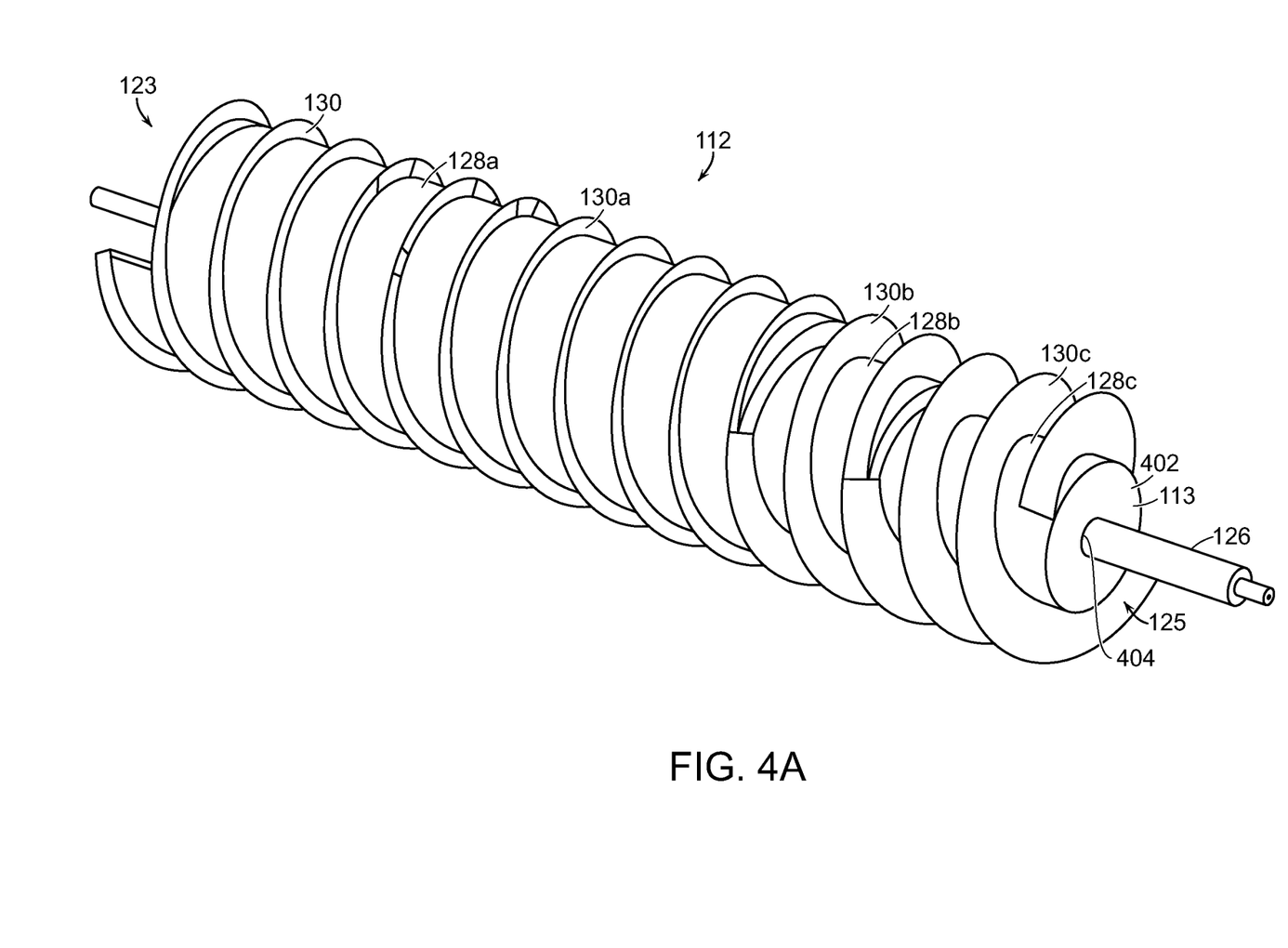
FIGS. 4A and 4B are isometric and cross-sectional isometric views, respectively, of an auger configured in accordance with an embodiment of the present technology.
Figure 4B:
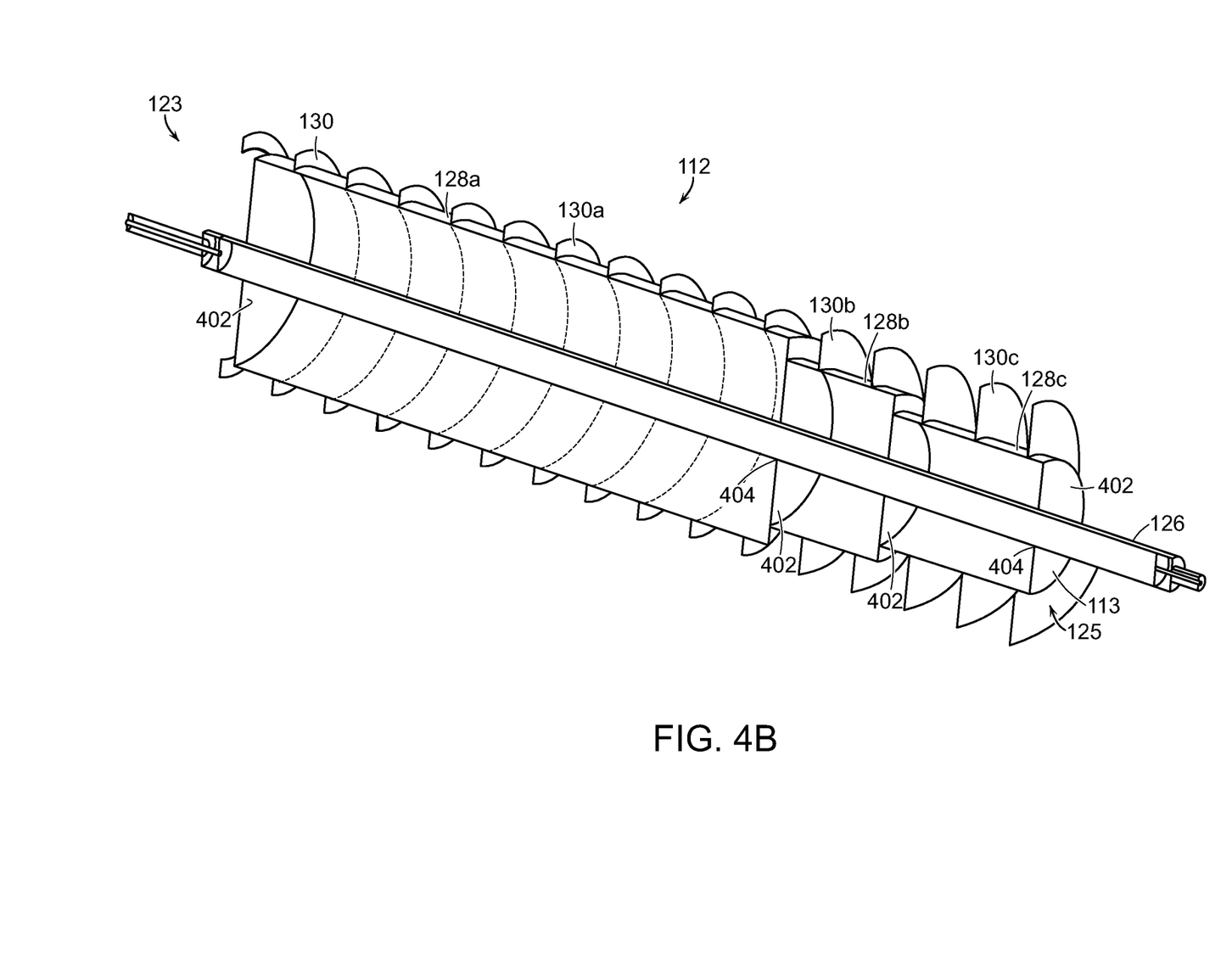

FIGS. 4A and 4B are isometric and cross-sectional isometric views, respectively, of the auger 112 configured in accordance with an embodiment of the present technology. In the illustrated embodiment, the shaft 126 and cylindrical sections 128 are hollow, closed-end cylinders. In other embodiments, the shaft 126 and/or the cylindrical sections 128 can be solid cylinders. The flight 130 can include multiple sections corresponding to the cylindrical sections 128. For example, the flight 130 can include a first section 130a extending around the first cylindrical section 128a, a second section 130b extending around the second cylindrical section 128b, and a third section 130c extending around the third cylindrical section 128c. The sections 130a, 130b and 130c can have outside diameters that match the diameter of the tube 114, and inside diameters that match the diameter of their corresponding cylindrical sections 128a, 128b, and 128c, respectively.

In several embodiments, the shaft 126, the cylindrical sections 128 and/or the flight 130 can be made from metal or metal alloys (e.g., stainless steel). The auger 112 can be constructed via a variety of fabrication methods known in the art, including casting, cutting, rolling, bending, welding, etc. For example, the cylindrical sections 128 can be constructed from stainless steel pipe that is cut into sections. End pieces 402 can be welded to one or both ends of the sections of pipe to form the cylindrical sections 128, and a central hole 404 can be cut in the end pieces 402. The cylindrical sections 128 can be coaxially aligned and welded together, and the shaft 126 can be positioned to extend longitudinally through the central hole 404. The shaft 126 can be welded to the end pieces 402, and the sections 130a, 130b and 130c of the flight 130 can be wound around their corresponding cylindrical sections 128a, 128b and 128c, respectively, and welded thereto.

Referring to FIGS. 1-4B together, in operation the burners 304 can combust gas to heat the combustion chamber 305 and the tube 114. The motor 131 can be energized to rotate the auger 112 in a direction $R_F$ (FIG. 1), and unpopped corn kernels and other ingredients (e.g., melted sugar) can be added to the process chamber 115 via the feed tube 206 (FIG. 1) and/or via other inlets or openings into the process chamber 115. In several embodiments, sugar (in solid or liquid form) can be added via an inlet positioned adjacent to the third zone 129c. The heating of the tube 114 heats the process chamber 115 and the ingredients therein. As the auger 112 rotates in the direction $R_F$, the auger flight 130 moves the ingredients along the lower tube portion 114b from the first end 116 toward the second end 118. With the upper housing portion 102b in a closed position, the process chamber 115 can retain significant amounts of heat. As the ingredients move along the lower tube portion 114b within the process chamber 115, heat is transmitted to the ingredients via the lower tube portion 114b and the heated air within the process chamber 115, thereby increasing the temperature of the ingredients.

When the heating process raises the internal temperature of popcorn kernels within the process chamber 115 to approximately 180 degrees Celsius, the popcorn kernels pop and expand in volume. A variety of factors can influence the location along the tube 114 at which the popcorn kernels reach popping temperature. For example, the rate of rotation of the auger 112, the angle of the flight 130 with respect to the cylindrical sections 128, the rate of gas combusted by the burners 304, the positioning and efficiency of the burners 304, the dimensions of the tube 114, and/or a variety of other factors. In the illustrated embodiment of FIGS. 1-4B, the popcorn machine 100 is constructed to pop popcorn kernels at approximately the transition from the first zone 129a to the second zone 129b (FIG. 1). The increasing volume of the process chamber 115 associated with the transition from the first zone 129a to the second zone 129b provides additional space for the expanding popcorn.

As the ingredients continue along the lower tube portion 114b and through the process chamber 115, more of the popcorn kernels pop, causing additional expansion of the ingredients. Prior to reaching the end of the third zone 129a, a majority of the popcorn kernels have popped and expanded. The expansion pushes some of the popped popcorn in the channel 117 above the lower tube portion 114b. As the auger 112 continues to turn, the flight 130 moves the popped popcorn toward the end wall 121 and popcorn above the lower tube portion 114b is pushed over the end wall 121 and into the exit chamber 119. The popcorn then falls downwardly and is directed away from the popcorn machine 100 by the discharge chute 132. Continued rotation of the auger 112 pushes more popcorn above the lower tube portion 114b and into the exit chamber 119.

In one aspect of the illustrated embodiment, the burners 304 can provide differential heating to different zones of the process chamber 115. For example, in one embodiment, the first burner 304a can heat the first zone 129a of the process chamber 115 to a first temperature, the second burner 304b can heat the second zone 129b to a second temperature, higher than the first temperature, and the third burner 304c can heat the third zone 129c to a third temperature, higher than the second temperature. In other embodiments, the zones 129 may be heated to provide the first zone 129a or the second zone 129b with the highest temperature. The differential heating of the different zones 129 can be adjusted as necessary to provide improved heating and popping of popcorn in the process chamber 115. For example, the thermocouple 136 (and/or additional thermocouples) can measure temperatures within the process chamber 115, and manual and/or automatic adjustments to a gas supply rate for the burners can be made based on the temperature measurements. In several embodiments, one or more controllers can monitor multiple thermocouples and vary the temperature within the process chamber 115 along the longitudinal axis A (e.g., establishing a higher temperature in the third zone 129c than in the first zone 129a and the second zone 129b).

In several embodiments, the popcorn machine 100 can include one or more components, devices and/or features that are at least generally similar to those described in U.S. patent application Ser. No. 12/891,722, filed Sep. 27, 2010, and entitled POPCORN MACHINES AND OTHER MACHINES HAVING REVERSIBLE FOOD MOVING DEVICES FOR POPPING POPCORN AND PRODUCING OTHER TYPES OF EXPANDED FOODS, in U.S. Pat. No. 8,201,492, filed Mar. 6, 2009, and entitled POPCORN POPPING MACHINES AND ASSOCIATED METHODS OF MANUFACTURE AND USE, in U.S. patent application Ser. No. 11/942,648, filed Nov. 19, 2007, and entitled POPCORN MACHINES AND OTHER MACHINES HAVING MULTIPLE HEAT ZONE COOKING SURFACES FOR PRODUCING POPCORN AND OTHER TYPES OF EXPANDED FOODS, and/or in U.S. Patent Application No. 62/425,877, filed Nov. 23, 2016, and entitled, CONTINUOUS POPCORN MACHINES HAVING VARIABLE HEATING PROFILES AND ASSOCIATED SYSTEMS AND METHODS, each of which is incorporated herein by reference in its entirety.

Figure 5:
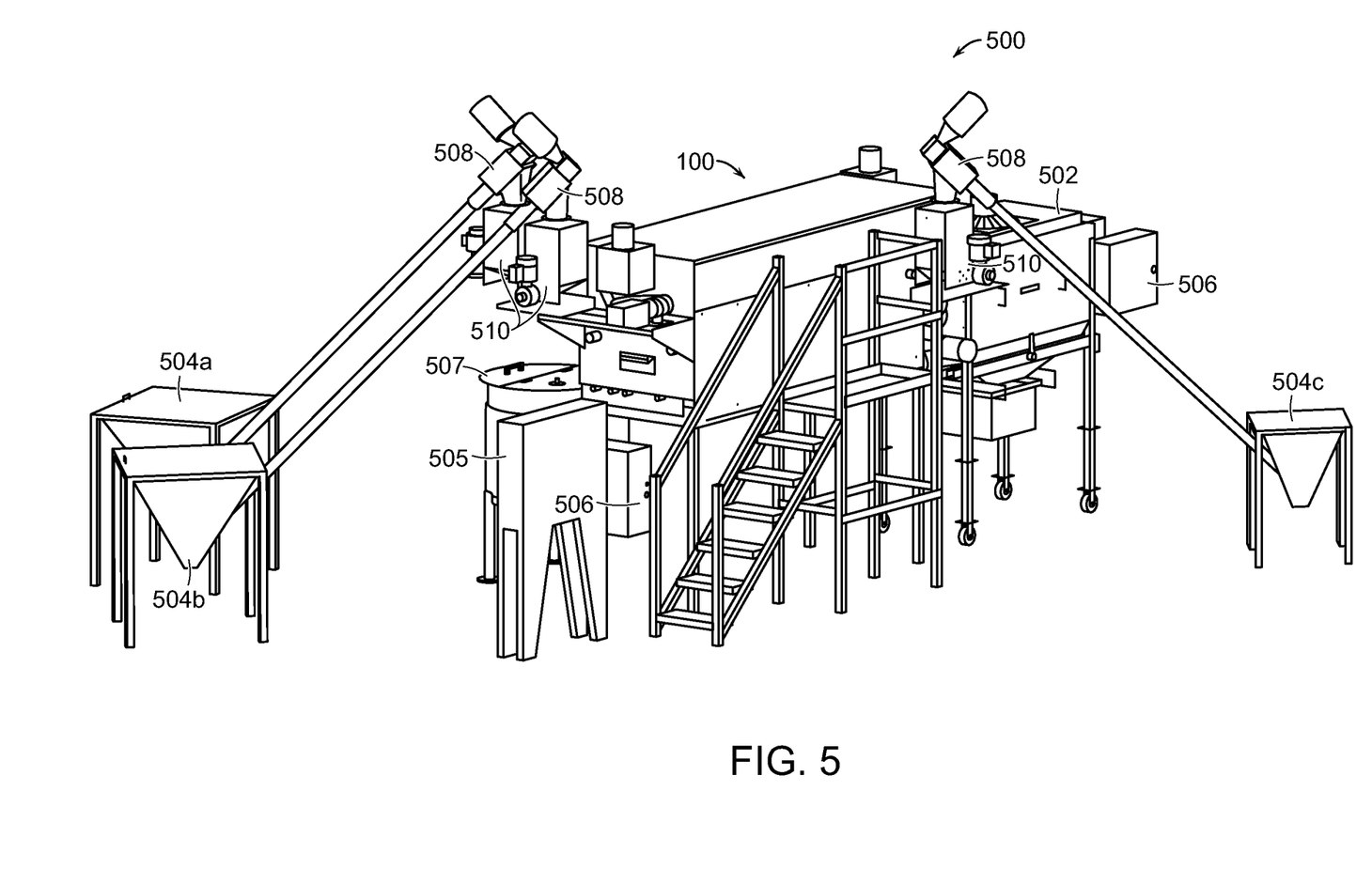
FIG. 5 is an isometric view of an industrial food production line configured in accordance with an embodiment of the present technology.

FIG. 5 is an isometric view of an industrial food production line 500 configured in accordance with an embodiment of the present technology. In the illustrated embodiment, the production line 500 includes the popcorn machine 100, a sifter/cooler 502, ingredient hoppers 504 (identified individually as a first ingredient hopper 504a, a second ingredient hopper 504b, and a third ingredient hopper 504c), a main control panel 505, and one or more of auxiliary control panels 506. The production line 500 also includes an oil kettle 507, and a plurality of ingredient feeders 508 and mixers 510. The control panels 505 and 506 can provide electrical power to and operational control of various components of the production line 500. For example, one or more of the control panels 505 and 506 can provide electrical power and/or control signals to the popcorn machine 100, the sifter/cooler 502, the hoppers 504, the kettle 507, the feeders 508, and/or the mixers 510.

In operation, the production line 500 can produce large volumes (e.g., 250 pounds per hour) of popped popcorn that is salted, sweetened, and/or flavored. For example, in several embodiments, the main control panel 505 can be operated to energize the feeders 508 to move unpopped corn kernels, sugar and/or salt from the hoppers 504 to the mixers 510. The control panel 505 can also activate the mixers 510 to mix and move the corn kernels, sugar and/or salt into the process chamber 115 via, e.g., the feed tube 206. Additionally, the control panel 505 can activate a pump (not shown) to move heated oil from the kettle to the process chamber 115. The control panel 505 can also energize the burners 304, and initiate rotation of the auger 112 to heat the ingredients and move the ingredients through the process chamber 115, thereby popping and flavoring the popcorn in the manner described above with respect to FIGS. 1-4B.

The sifter/cooler 502 can include a mesh drum and one or more blowers positioned to direct cooling air at the drum contents, and the sifter/cooler 502 can be positioned to receive salted, sweetened and/or flavored popcorn that is discharged from the popcorn machine 100 via the discharge chute 132. The control panel 505 can initiate rotation of the drum and the blowers to sift and cool the popcorn. The sifter/cooler 502 can discharge the cooled and sifted popcorn to a receptacle, to conveyer line, and/or a product packaging system.

In addition to the mixers 510, one or more sugar melters (not shown) can be operably coupled to the popcorn machine 100 to provide liquid sugar to the process chamber 115 to produce sugar coated popcorn. The sugar melter can be at least generally similar in structure and function to those described in U.S. patent application Ser. No. 15/380,928, filed Dec. 15, 2016, and titled SYSTEMS AND APPARATUSES FOR MELTING SUGAR AND/OR SIMILAR SUBSTANCES, AND ASSOCIATED METHODS OF USE AND MANUFACTURE, the entirety of which is incorporated herein by reference. In embodiments including sugar melters, liquid sugar can be provided to the process chamber 115 via the feed tube 206 and/or via other openings into the process chamber 115 (e.g., openings positioned to deliver liquid sugar to the first zone 129a, the second zone 129b and/or to the third zone 129c).

In several embodiments, the control panel 505 can monitor temperatures and/or other operating parameters of the popcorn machine 100 and adjust various settings to improve the quality of the popcorn product. For example, the control panel 505 can monitor one or more temperatures via the thermocouple 136 and adjust a flow of gas to one or more burners 304 or adjust a rate or direction of rotation of the auger 112. In some embodiments, the adjustments to the operation of the popcorn machine 100 via the control panel 505 are manually entered via an operator, in other embodiments, the adjustments can be automatically made via the control panel 505. For example, the control panel 505 can include one or more computer readable media storing instructions for operation of the popcorn machine 100 and/or the production line 500. The control panel can also include one or more processors for executing the instructions on the computer readable media, and a variety of electronic and/or electromechanical components for controlling operations of the popcorn machine 100 and the production line 500 (e.g., relays, programmable logic controllers, circuit boards, touch screens, etc.).

In one aspect of the illustrated embodiments, the motor 131 (FIG. 1) can be a servo motor that can drive the auger 112 to rotate in two different directions. The servo motor 131 can be controlled via the control panel 505 and programmed to rotate in the direction $R_F$ to drive ingredients from the first end 116 toward the second end 118 (i.e., a forward direction), as well as to rotate in an opposite direction $R_R$ to drive ingredients from the second end 118 toward the first end 116 (i.e., a reverse direction). In some embodiments, the auger can repeatedly cycle between rotation in the forward direction $R_F$ and the reverse direction $R_R$ during operation. In several such embodiments, the time of rotation in the forward direction $R_F$ can be greater than the time of rotation in the reverse direction $R_R$. In some embodiments, the rate of rotation in the forward direction $R_F$ can differ from that in the reverse direction $R_R$. For example, in one embodiment, the rate of rotation can be greater in the reverse direction $R_R$ than in the forward direction $R_F$. In such embodiments, movement of ingredients from the first end 116 of the popcorn machine 100 to the second end 118 can include rotation of the auger 112 in the forward direction $R_F$ for a longer period of time than in the reverse direction $R_R$. In some embodiments, the control panel 505 can monitor temperatures and/or other parameters within the process chamber 115 (e.g., humidity), and adjust the rotation of the auger 112 to improve the popping and/or cooking conditions. For example, the control panel 505 can vary a direction of rotation, rate of rotation, and/or a duration of rotation of the auger 112.

Popcorn machines configured in accordance with the present technology can include augers that taper or step down in a variety of manners. For example, although the auger 112 described above includes a central portion 113 that tapers via the decreasing diameters of the cylindrical sections 128, other augers can taper in a linear manner. For example, several embodiments can include augers having central portions shaped as truncated cones. In other embodiments, augers can include central portions that taper in a parabolic manner, or in any a variety of other manners. Additionally, although the tube 114 described above includes a constant diameter along the length of the process chamber 115, in other embodiments, a tube or other feature defining a process chamber can include a varying diameter. For example, a tube can include a diameter that increases along the length of a corresponding popping chamber. In such an embodiment, an associated auger can include a central portion having a constant diameter, and the popping chamber can expand in volume along the length via the increasing diameter of the tube. In this embodiment, an outside diameter of the flight(s) can expand along the length of the associated auger to match the expanding diameter of the corresponding tube.

From the foregoing, it will be appreciated that specific embodiments have been described herein for purposes of illustration, but that various modifications may be made without deviating from the spirit and scope of the present technology. Those skilled in the art will recognize that numerous modifications or alterations can be made to the components or systems disclosed herein. Moreover, certain aspects of the present technology described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the present technology. Accordingly, the inventions are not limited except as by the appended claims.

We claim:

1. A popcorn machine, comprising:
a tube extending along a longitudinal axis between a front wall and a rear wall;
a heating element positioned to heat the tube;
an auger positioned at least partially within the tube, wherein the auger and the tube define an annular process chamber therebetween, wherein the auger includes a central portion extending along the longitudinal axis, wherein the central portion includes a first section positioned directly adjacent to the front wall and a second section positioned between the first section and the rear wall, wherein the first section has a first diameter and defines a first zone of the process chamber, and wherein the second section has a second diameter less than the first diameter and defines a second zone of the process chamber, and
an inlet positioned directly adjacent to the front wall and configured to deliver popcorn directly into the first zone, wherein the auger is rotatable to move the popcorn through the first and second zones.

2. The popcorn machine of claim 1 wherein the tube has a constant inner diameter adjacent to the first and second zones, and wherein the popcorn machine further comprises a flight carried by the central portion, wherein the flight has a constant outside diameter in the first and second zones that is less than the inner diameter of the tube.

3. The popcorn machine of claim 1 wherein the tube has a constant inner diameter adjacent to the first and second zones, and wherein the popcorn machine further comprises a flight extending around the central portion, wherein the flight has (a) a constant outside diameter in the first and second zones that is less than the inner diameter of the tube, (b) a first inside diameter in the first zone that is the same as the first diameter of the central portion, and (c) a second inside diameter in the second zone that is the same as the second diameter of the central portion.

4. The popcorn machine of claim 1 wherein the first zone extends from proximate the front wall to past a midpoint of the tube.

5. The popcorn machine of claim 1 wherein the popcorn includes popcorn kernels, and wherein the popcorn machine further comprises a control system operatively connected to the heating element and the auger, wherein the control system includes at least one non-transitory computer readable medium storing instructions that, when executed by the control system, cause the heating element to heat the process chamber and the auger to rotate such that the popcorn kernels reach a popping temperature at a transition from the first zone to the second zone.

6. The popcorn machine of claim 1 further comprising a control system operatively coupled to the heating element, wherein the control system includes at least one non-transitory computer readable medium storing instructions that, when executed by the control system, cause the heating element to heat (a) the first zone to a first temperature and (b) the second zone to a second temperature, greater than the first temperature.

7. The popcorn machine of claim 1 wherein the auger is rotatable in a first direction to move the ingredients through the first zone toward the second zone, wherein the auger is rotatable in a second direction, opposite to the first direction, to move the ingredients through the second zone toward the first zone, and wherein the popcorn machine further comprises a control system operatively coupled to the auger, wherein the control system includes at least one non-transitory computer readable medium storing instructions that, when executed by the control system, cause the auger to cycle between rotating in the first direction at a first rate and rotating in the second direction at a second rate, lower than the first rate, such that the ingredients move through the length of the tube.

8. The popcorn machine of claim 7 wherein the instructions, when executed by the control system, further cause the auger to cycle between rotating in the first and second directions for the same period of time.

9. The popcorn machine of claim 1 wherein the central portion has a diameter that continuously decreases from the front wall to the rear wall.

10. The popcorn machine of claim 1 wherein
the first section is a first cylindrical section having the first diameter;
the second section is a second cylindrical section having the second diameter; and
wherein the central portion further includes a third cylindrical section having a third diameter less than the second diameter and defining a third zone of the annular process chamber.

11. The popcorn machine of claim 10 wherein the auger is rotatable to move the popcorn through the annular process chamber (a) through the first zone toward the second zone, (b) through the second zone toward the third zone, and (c) through the third zone.

12. The popcorn machine of claim 10 wherein the inlet positioned adjacent to the front wall is a first inlet that extends through the front wall and is configured for receiving unpopped corn kernels, and wherein the tube includes a second inlet positioned adjacent to the third zone for receiving sugar.

13. The popcorn machine of claim 10 wherein
the first cylindrical section has a first length along the longitudinal axis,
the third cylindrical section is proximate the rear wall and has a second length along the longitudinal axis, less than the first length, and
the second cylindrical section is positioned between the first and third cylindrical sections and has a third length along the longitudinal axis, less than the second length.

14. The popcorn machine of claim 1 wherein the first section and the second section are circular cylinders.

* * * * *

UNITED STATES PATENT AND TRADEMARK OFFICE
CERTIFICATE OF CORRECTION

| | |
|---|---|
| PATENT NO. | : 11,044,929 B2 |
| APPLICATION NO. | : 15/843638 |
| DATED | : June 29, 2021 |
| INVENTOR(S) | : Charles D. Cretors et al. |

It is certified that error appears in the above-identified patent and that said Letters Patent is hereby corrected as shown below:

On the Title Page

Item (73), in Column 1, in "Assignee", Line 1, delete "Company" and insert -- Company, IL (US) --.

Signed and Sealed this
Twenty-fifth Day of October, 2022

Katherine Kelly Vidal
*Director of the United States Patent and Trademark Office*